United States Patent
Patel

(10) Patent No.: US 8,152,887 B2
(45) Date of Patent: Apr. 10, 2012

(54) AIR/OIL SEPARATOR

(75) Inventor: Ankur Patel, Portage, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 650 days.

(21) Appl. No.: 12/334,974

(22) Filed: Dec. 15, 2008

(65) Prior Publication Data

US 2010/0147153 A1   Jun. 17, 2010

(51) Int. Cl.
*B01D 50/00* (2006.01)

(52) U.S. Cl. ........... 55/485; 55/527; 55/528; 55/423; 55/486; 55/487; 55/498; 55/501; 55/489; 55/320; 55/321; 55/322; 55/323; 55/325; 55/330; 55/DIG. 19; 55/DIG. 25; 96/190; 96/188; 210/85; 210/489; 210/490; 210/491; 123/198 E

(58) Field of Classification Search ............ 96/190, 96/188; 210/85, 489–491; 123/198 E; 55/485, 55/527, 528, 423, 486, 487, 498, 501, 502, 55/489, 320–323, 325, 330, DIG. 19, DIG. 25
See application file for complete search history.

(56) References Cited

U.S. PATENT DOCUMENTS

| | | | |
|---|---|---|---|
| 4,102,785 A * | 7/1978 | Head et al. ............ 210/767 |
| 4,157,968 A * | 6/1979 | Kronsbein ............ 210/489 |
| 4,203,739 A * | 5/1980 | Erdmannsdorfer ....... 55/323 |
| 4,233,042 A * | 11/1980 | Tao ..................... 55/482 |
| 4,294,599 A * | 10/1981 | Grovesteen et al. ..... 55/485 |
| 4,610,705 A * | 9/1986 | Sarnosky et al. ........ 96/135 |
| 4,629,479 A * | 12/1986 | Cantoni ................ 96/55 |
| 4,632,682 A | 12/1986 | Erdmannsdorfer |
| 4,878,929 A * | 11/1989 | Tofsland et al. ........ 55/486 |
| 4,976,759 A * | 12/1990 | Foltz .................. 55/487 |
| 5,108,474 A * | 4/1992 | Riedy et al. ........... 55/485 |
| 5,123,936 A * | 6/1992 | Stone et al. ........... 95/65 |
| 5,288,298 A * | 2/1994 | Aston ................. 96/135 |
| 5,389,121 A * | 2/1995 | Pfeffer ................ 55/487 |
| 5,454,845 A * | 10/1995 | Anahara et al. ....... 55/482.1 |
| 5,525,136 A * | 6/1996 | Rosen ................. 55/486 |
| 5,716,423 A * | 2/1998 | Krul et al. ............ 55/485 |
| 5,728,298 A * | 3/1998 | Hamlin ............... 210/491 |
| 5,800,584 A | 9/1998 | Hinderer et al. |
| 5,858,040 A * | 1/1999 | Hansen ............... 55/385.2 |

(Continued)

OTHER PUBLICATIONS

Mann Hummel brochure, published Jan. 17, 2001.

*Primary Examiner* — Jason M Greene
*Assistant Examiner* — Dung H Bui
(74) *Attorney, Agent, or Firm* — James Hasselbeck

(57) ABSTRACT

An improved air/oil separator assembly for removal of oil from a gaseous stream is disclosed. The air/oil separator includes a head flange and an end plate positioned in a spaced-parallel relationship. A first and a second elongated support member and an outer jacket are concentrically arranged and secured along opposing ends to the head flange and end plate. A first separator element is secured in a position proximate to and outboard of the first support member and a second separator element is secured in a position proximate to and outboard of the second support member. A pre-separator element is secured in a position proximate to and outboard of the second separator element but inboard of the outer jacket. The pre-separator and separator elements are operative to remove oil from the gaseous stream. The pre-separator improves oil removal performance by removing a significant amount of oil before it reaches the separator elements.

9 Claims, 3 Drawing Sheets

U.S. PATENT DOCUMENTS

| | | | | |
|---|---|---|---|---|
| 5,961,678 A * | 10/1999 | Pruette et al. | ................... | 55/485 |
| 6,096,117 A * | 8/2000 | Lisson et al. | ................... | 95/273 |
| 7,094,270 B2 * | 8/2006 | Schultink et al. | ............... | 55/486 |
| 7,846,242 B2 * | 12/2010 | Paling et al. | ................... | 96/134 |
| 2007/0240390 A1 * | 10/2007 | Becker et al. | ................... | 55/423 |
| 2007/0240391 A1 * | 10/2007 | Becker et al. | ................... | 55/423 |
| 2008/0250772 A1 * | 10/2008 | Becker et al. | ................... | 60/269 |
| 2008/0314009 A1 * | 12/2008 | Ziebold et al. | ................. | 55/485 |
| 2010/0101199 A1 * | 4/2010 | Veeser et al. | ................... | 55/485 |

\* cited by examiner

AIR/OIL SEPARATOR

TECHNICAL FIELD

The present invention relates to air/oil separators and, more particularly, to air/oil separators having an integrated pre-separator.

BACKGROUND OF THE INVENTION

Many manufacturing processes require a constant supply of compressed gasses, such as compressed air. Compressed air may be used for many applications, for example, the actuation and control of pneumatic valves, air operated cylinders, controllers, operation of process machinery, pneumatically operated tooling, as a transport media for conveying bulk solids, or as a purge gas. Oil lubricated rotary air compressors of various types are commonly applied for generating a compressed air source for various applications.

One well known problem with compressed air systems is that a small amount of the compressor lubricating oil may become entrained into the compressed gas during the air compression process. It is desirable to remove the entrained oil from the compressed air supply to minimize the loss of lubricating oil as well as to reduce the chance of contamination of other downstream equipment and processes utilizing the compressed air. In attempts to overcome this issue various types of air/oil separators have been developed over the years. One example, U.S. Pat. No. 5,800,584 discloses a typical oil separator for separating oil from oil-laden compressed air that has one or more oil coalescing elements arranged on a support body inside of a housing. Another example is U.S. Pat. No. 4,632,682 that discloses a cartridge type air/oil separator and filter.

Another problem in air/oil separators is that the coalescing media tends to become saturated with oil during use thereby resulting in increased pressure drop across the air/oil separator due to blockage of a portion of the pores in the media. An additional problem arises in that the amount of oil carryover after the air/oil separator may still be too high for many applications.

As can be seen, there remains a need for an improved air/oil separator that reduces the amount of oil carryover, is effective in reducing oil saturation of the coalescing elements and reduces differential pressure drop across the air/oil separator.

SUMMARY OF THE INVENTION

The present invention provides an improved air/oil separator assembly adapted for the removal of entrained oil from a gaseous stream, for example a compressed air stream from an air compressor, while overcoming the limitations of the prior art (as discussed above in the Background and further below in the Detailed Description). The air/oil separator includes a head flange and an end plate positioned in a spaced-parallel relationship. The first and second elongated support members and the outer jacket are concentrically arranged and secured along opposing ends to the head flange and to the end plate. A first oil separator element is secured in a position proximate to and outboard of the first support member and a second oil separator element is secured in a position proximate to and outboard of the second support member. A pre-separator element is secured in a position proximate to and outboard of the second separator element but located inboard of the outer jacket. The pre-separator and separator elements together are operative to remove oil from the gaseous stream as it passes through the air/oil separator assembly. The pre-separator advantageously improves oil removal performance by removing a significant amount of oil before it reaches the separator elements. The integral mounting of the pre-separator inboard of the outer jacket prevents the pre-separator from becoming mechanically detached from the air/oil separator during operation.

In one aspect of the invention, the first and second elongated support members have a closed wall defining a bore or void therein. A plurality of openings is provided through the outer wall into the bore. The elongated support members are secured at opposing ends to the head flange and the end plate. The first and second support members define a first annular gap. The second support member and the outer jacket define a second annular gap.

The first separator element is secured in a position proximate to and outboard of the first support member and within the first annular gap. A second separator element is secured in a position proximate to and outboard of the second support member and within the second annular gap. The pre-separator element is secured in a position proximate to and outboard of the second separator element also within the second annular gap. The oil laden gaseous stream enters the assembly through the openings in the outer jacket, passing in sequence through the pre-separator element, the second separator element and then the first separator element to reach the outlet passage.

In another aspect of the invention, the first separator element and the second separator element include glass fiber media, for example, borosilicate glass fibers.

In another aspect of the invention, any of the pre-separator element and separator elements may individually include fleece media, glass fiber media or a bi-component fiber media.

In another aspect of the invention, the support members are tubular in shape (round cross section).

In another aspect of the invention, the support members have an oval cross section (cross section taken normal to a line of symmetry).

In another aspect of the invention, the separator elements and pre-separator are sealably secured to the flange and end plate using polyurethane.

In another aspect of the invention, the separator elements and pre-separator are sealably secured to the flange and end plate utilizing a self curing or a hot melt adhesive.

The above features and advantages together with other features and advantages of the present invention are readily apparent from the following detailed description of the best modes for carrying out the invention when taken in connection with the accompanying drawings.

DESCRIPTION OF THE PREFERRED EMBODIMENTS

An improved air/oil separator is provided by the present invention that is effective in reducing oil saturation of coalescing media, provides reduced differential pressure drop across the air/oil separator, and results in improved oil removal from an oil laden compressed gaseous stream.

Figure 1:
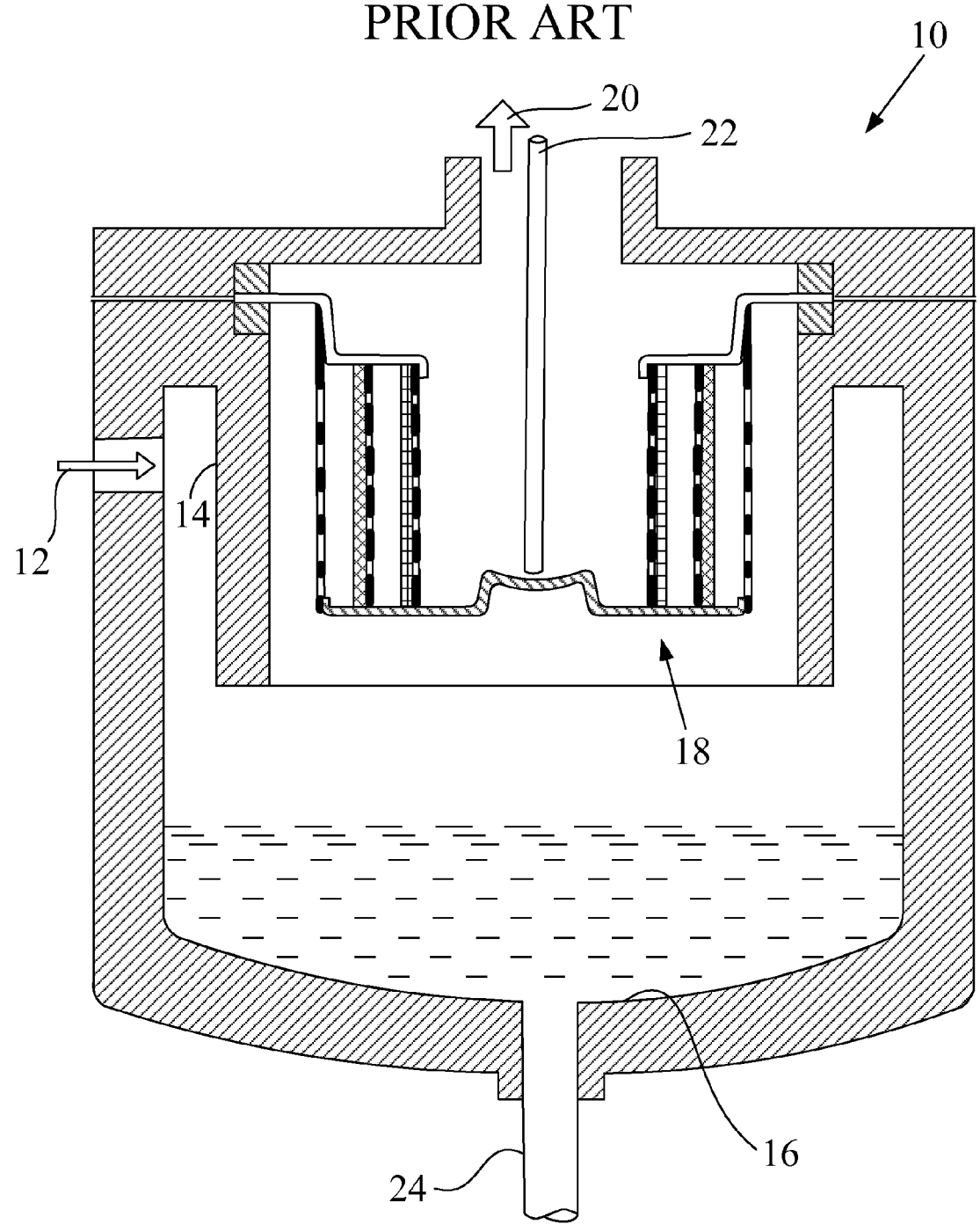
FIG. 1 illustrates a schematic sectional side view of a prior art air/oil separator including an air/oil separator tank and an air/oil separator assembly mounted therein.

For better understanding of improvements in the present invention, a prior art air/oil separator is shown in FIG. 1. The compressed gas stream 12 with entrained oil is directed into a separator chamber or tank 10 where a significant amount of the entrained oil (especially larger droplets) is separated by impinging against a wall or baffle 14, collecting in the bottom 16 of the chamber 10. The gaseous stream having the remaining entrained oil then passes through the air/oil separator assembly 18 containing glass fiber media that coalesces the oil on the media and thereby separates the oil from the gaseous stream, resulting in a significant reduction in oil content in the gaseous flow 20 exiting the air/oil separator. It is intended for the gaseous flow 20 leaving the air/oil separator 10 to be relatively free of entrained oil. Typically, the coalesced or separated oil is scavenged back from the air/oil separator 18 through an oil scavenge tube 22 and returned to the compressor or other processes to be reused. Additionally, a drain line 24 is typically provided at the bottom of the air/oil separator or tank 10 to remove oil from the tank and return it for re-use.

Figure 2:
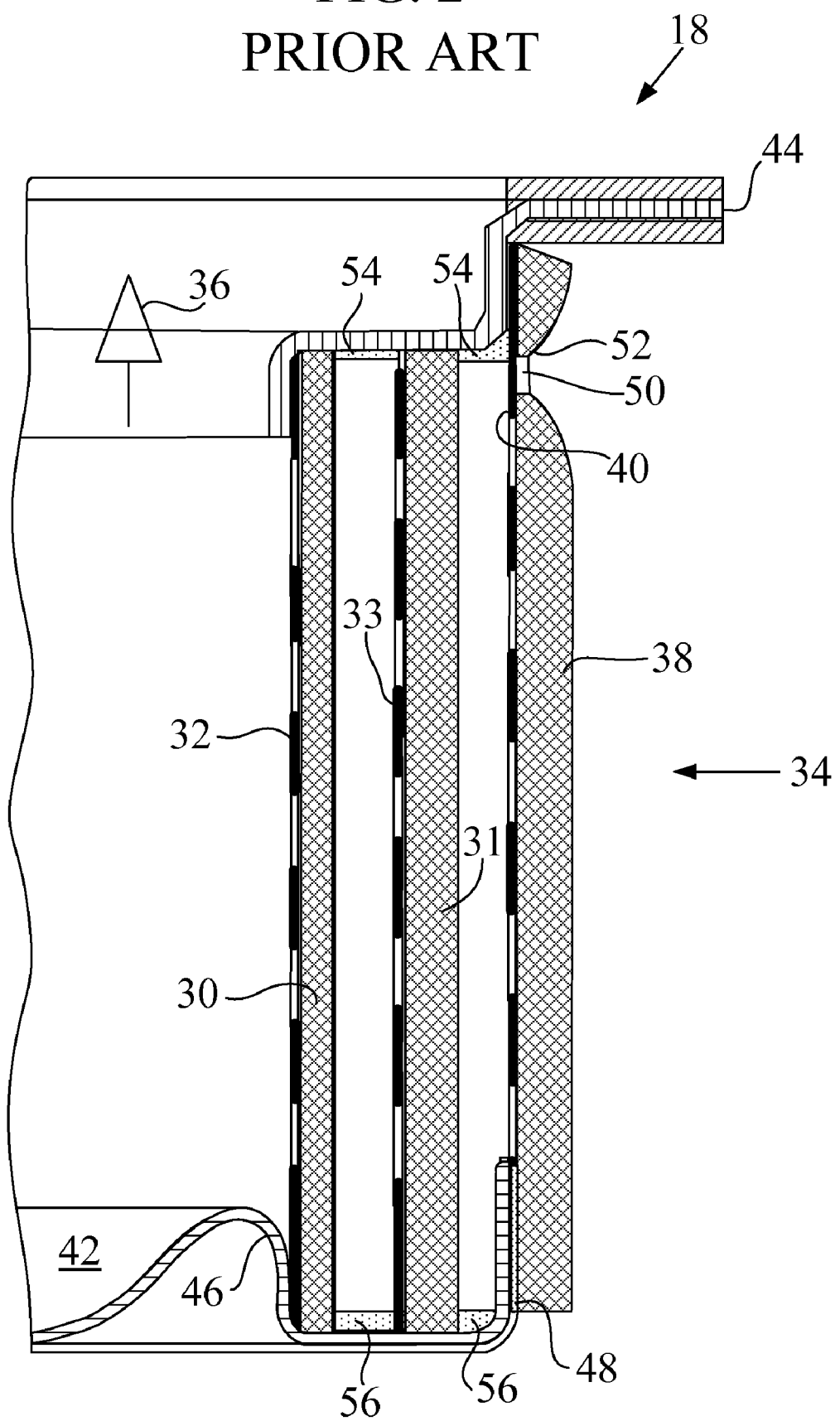
FIG. 2 illustrates a schematic sectional side view of a right hand portion (right side of centerline) of a prior art air/oil separator assembly.

FIG. 2 schematically depicts the right hand portion sectional side view of a prior art air/oil separator assembly, such as air/oil separator assembly 18 of FIG. 1. It is to be understood that the left portion of the separator assembly is essentially a mirror image of the right portion and is therefore not illustrated. The illustrated separator assembly 18 includes two media layers 30 and 31 sealably arranged such that the gaseous stream passes first through the media layer 31 and then through the inner media layer 30 (the layer positioned proximate to the center line). The media layers 30 and 31 are each wrapped about its proximally related porous tubular support member 32 or 33 (shown positioned proximate to the media layers).

Media layers 30 and 31 are sealably and supportively secured to the flange 44 by an adhesive 54 disposed at the upper portion of each media layer 30, 31 at the inside surface of the flange 44. Similarly, the lower end of each media layer 30, 31 is sealably and supportively secured to the end plate 46 by an adhesive 56 disposed at a lower portion of the each media layer 30, 31 at the inside surface of the end plate 46.

The oil-laden gaseous stream flows into the air/oil separator assembly 18 as illustrated by arrow 34 and exits the assembly 18 through a central outlet passage as illustrated by outflow arrow 36. Substantial portions of the oil entrained in the gaseous stream is captured on the fibers of media layers 30, 31 and when the oil droplets grow large enough, the droplets drain down the media and collect at the end plate 46 where they puddle or accumulate into the cup region 42 of the end plate 46 to be scavenged back to the process, such as through oil scavenge tube 22 (see FIG. 1).

As discussed earlier in the Background section of this document, air/oil separators are applied to reduce the amount of oil carryover; therefore improved oil separation capability is always highly desired. One way of improving the oil separating capabilities of an air/oil separator is to provide a pre-separator media layer 38 (see FIG. 2) mounted or secured about the perforated outer jacket 40. The pre-separator 38 provides an additional separator media layer for the coalescing and removal of oil. The pre-separator 38 is preferably a polyester fleece media.

FIG. 2 illustrates one method of providing a pre-separator on an air/oil separator. In FIG. 2, the pre-separator fleece 38 is secured to the perforated outer jacket 40 utilizing a tensioned metal band 50. The metal band 50 is positioned into a v-notch 52 provided in the fleece 38. The metal band 50 is then compressibly tightened onto the perforated outer jacket 40 by mechanically reducing the circumference of the band 50, thereby compressibly securing the upper portion of fleece 38 about the perforated outer jacket 40. Although not clearly shown in FIG. 2, the v-notch 52 is open in portions along the v-notch 52 to permit the metal band 50 to conductively contact the outer jacket 40 through the pre-separator fleece 38 so as to provide a conductive electrical path for dissipation of any accumulated static electric charge from the fleece 38. To dissipate this electric charge the flange 44, perforated outer jacket 40, porous tubular members 32 and end plate 46 are typically formed of or at least include as a component thereof an electrically conductive metallic material provided with a conductive path to ground for the removal of the electrical charge from the interior components.

In addition to the metal band 50, the lower portion of the pre-separator fleece 38 is adhesively secured to the outer jacket 40 by using, for example, a hot melt or curable adhesive or glue 48 to sealably secure the fleece in position over the outer jacket. This adhesive seal is necessary to provide a seal between the pre-separator 38 and the jacket 40 so as to constrain the gas flow to pass first through the pre-separator fleece before reaching the glass fiber media layers 30.

One disadvantage of this configuration is that, during manufacture of the air/oil separator assembly 18 of FIG. 2 the glue must be applied very carefully so that the fleece 38 will adhere satisfactorily to the outer jacket 40 but does not overly saturate the pre-separator fleece 38 along its lower portion. This glue step is relatively time consuming in production manufacturing and would be advantageous to eliminate.

Air/oil separator field operating experience indicates another drawback of the air/oil separator configuration shown in FIG. 2 in that the mounting means of the fleece 38 to the outer jacket 40 can occasionally fail, thereby permitting the fleece 38 to separate from the outer jacket 40 and then drop downwards into the bottom 16 of the separator chamber or tank 10 (see FIG. 1) where it can block drainage of the chamber oil return line 24. This is undesirable as it can result in damage to the air compressor and may permit oil to accumulate within and eventually fill the separator chamber or tank 10.

Figure 3:
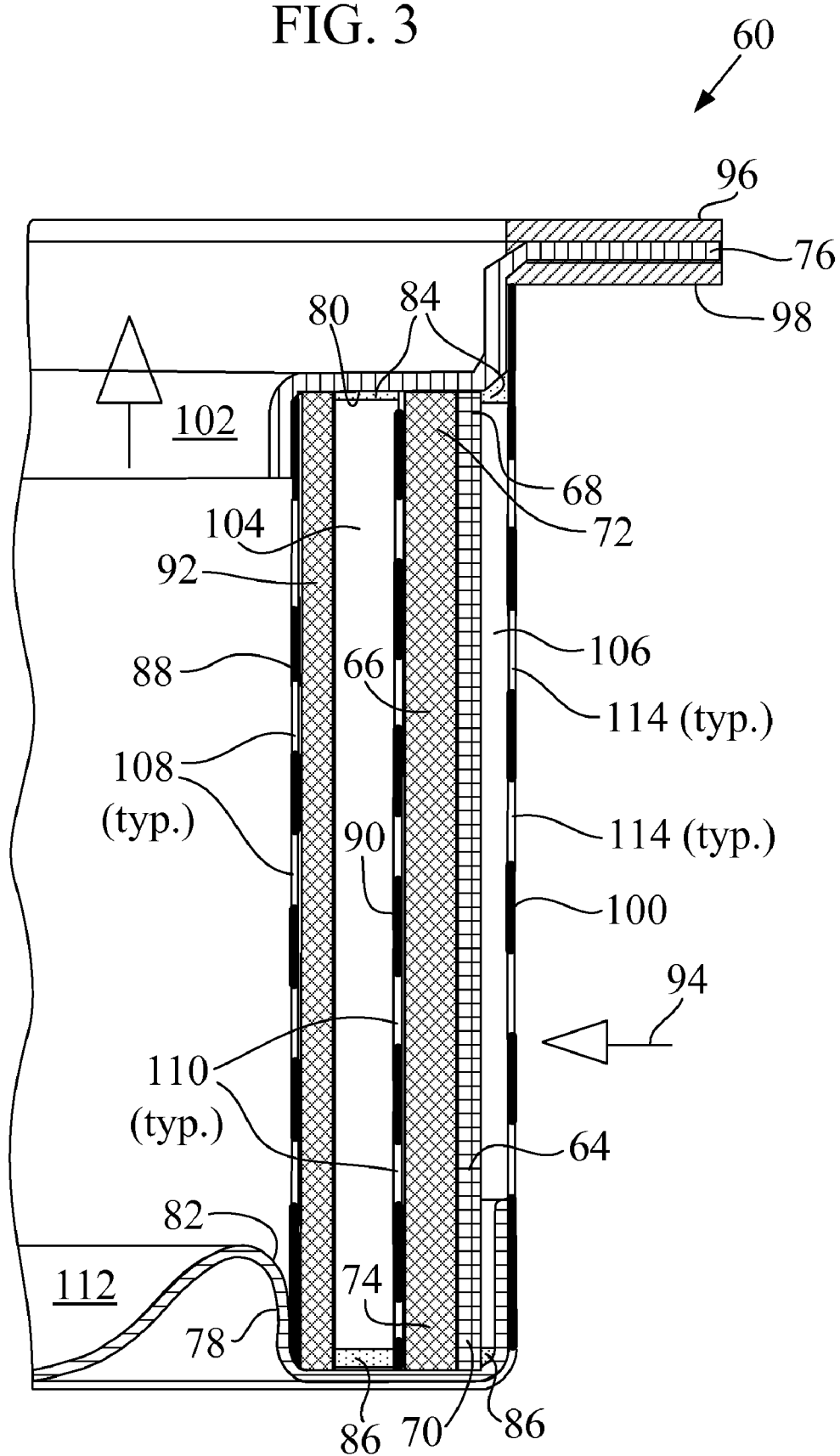
FIG. 3 illustrates a schematic sectional side view of a right hand portion (right side of centerline) of an improved air/oil separator assembly, consistent with the present invention.

An innovative solution to the drawbacks of the prior art is provided by the present invention, the improved air/oil separator assembly 60 illustrated in FIG. 3. In the improved air/oil separator assembly 60 a pre-separator fleece 64 is permanently secured to the outer fiber media 66, but positioned and retained within the air/oil separator assembly 60. The air/oil separator 60 includes a head flange 76 and an end plate 78 positioned in a spaced parallel relationship. An elongated first support member 88 and an elongated second support member 90 are axially aligned between the flange 76 and end plate 78 and concentrically aligned to each other. The support members 88 and 90 disposed between the head flange 76 and the end plate 78 are secured at one end to the head flange 76 and at an opposing end to the end plate 78. In the illustrated embodiment, the support members 88 and 90 are tubular in shape.

The elongated support members 88 and 90 each include a plurality of gas permeable openings extending through an elongated peripheral outer wall into a void or bore therein. Elongated support members 88 and 90 may be of any shape including (for example) tubular, oval in cross section, elliptical or rectangular in cross section. The peripheral outer wall includes a plurality of openings (openings 108 in the first support member 88, and openings 110 in the second support member 90) allowing the gaseous stream to flow through the support member. Preferably support members 88 and 90 are tubular in shape and sized such that the first support member 88 is concentrically received within the second support member 90, with the first and second support members defining a first annular gap 104. An inner fiber media layer 92 is wrapped about an outside surface of the first support member 88. Similarly, the outer fiber media layer 66 is wrapped about an outside surface of the second support member 90.

Preferably the outer fiber media layer 66 is a glass fiber media. Also preferably the inner fiber media layer 92 is a polyester fleece media as it has been shown to be particularly useful in removing remaining traces of entrain oil from the gaseous stream. In various alternative embodiments, the inner fiber media layer 92 and outer fiber media layer 66 instead may each individually be any combination of fibrous media such as polyester fibers, glass fibers, or bi-component polyester fibers. Bi-component fibers are particularly useful for forming a sheet of fiber media. Bi-component fibers generally have an inner core of a material having a higher melting pointer temperature than the outer sheath material. Media sheets of bi-component fibers are then manufacturable by heating the fibers to or above the melting point temperature of the sheath material so as to soften the sheath material. When the fiber sheet is cooled, the outer sheath material acts to bind together neighboring fibers, thereby forming a cohesive sheet of fiber media that may be trimmed for use as a fiber media layer in the present invention. Additionally it is envisioned that media layers (66 and 92) may alternately include other types of known non-glass fiber woven, non-woven web materials or foam materials.

The fiber media layers 92 and 66 provide a means for coalescing oil from the gaseous stream. The support members 88 and 90 provide radial support to the fiber media layers 92 and 66 to prevent their collapse due to gaseous flow induced forces during operation, such as may be applied by gaseous flow indicated by flow arrow 94. Advantageously, a pre-separator fleece layer 64 is now secured outboard of and resting against the outer glass fiber media layer 66, such that the pre-separator fleece receives radial support from the outer glass fiber media layer 66 and support member 90. An outer jacket 100 having openings 114 therethrough is provided outboard of the pre-separator 64. Preferably the outer jacket 100 is sized and configured such that the fiber media layers 66, 92 and the pre-separator fleece 64 are concentrically received within the outer jacket 100, with the second support member 90 and the outer jacket 100 defining a second annular space 106 therebetween.

Within this disclosure the descriptive terms "separator elements" 66 and 92 and "fiber media" 66 and 92 are used interchangeably.

The upper portion 72 of the outer fiber media layer 66 and upper portion 68 of the pre-separator fleece 64 are permanently and sealably secured to the interior facing surface 80 of the head flange 76 by adhesive glue 84. Similarly, the lower portion 74 of the outer fiber media layer 66 and lower portion 70 of the pre-separator fleece 64 are permanently and sealably secured to the interior surface 82 of the end plate 78 by adhesive 86. Adhesives 84 and 86 may be any suitable variety of self-curing or hot melt adhesive material that provides a reliable seal preventing the gas flow from bypassing the glass fiber media 66, 92 and fleece 64. It is furthermore important that the selected adhesive is not affected chemically by exposure to the compressed gaseous and oil, and that it provides secure mounting of the glass fiber and fleece media in the improved air/oil separator assembly 60. One preferable adhesive material is polyurethane.

The outer jacket 100 includes a plurality of gas permeable openings 114 therethrough. As with the support members 88 and 90, the outer jacket 100 may be of any shape including (for example) tubular, oval in cross section, or rectangular or elliptical in cross section. In a preferred embodiment, the outer jacket 100 is arranged in axial alignment with and spaced outwards from the support members 88 and 90 such that the pre-separator fleece 64 as well as the outer fiber media 66 are positioned outboard of the support members 88 and 90 and inboard of the outer jacket 100. The flange 76 of air/oil separator 60 is provided with a first seal 96 and a second seal 98 configured to provide axial sealing between the flange 76 of the separator assembly 60 and the separator tank or chamber when installed (see FIG. 1). The flange 76 and seals 96 and 98 sealably mate against complimentary surfaces provided in the separator tank or chamber.

In some embodiments, the pre-separator fleece 64 may be directly and permanently secured onto the outer surface of the outer fiber media 66. In other embodiments, the outer pre-separator fleece is not secured directly to the fiber media 66, but instead relies upon adhesive applied along its opposing edges, specifically the adhesive 84 at the flange and adhesive 86 at the end plate to secure the fleece in position outboard of the glass fiber media 66.

An oil laden gaseous stream, for example a compressed air stream, enters the improved air/oil separator assembly 60 through openings 114 in the outer jacket 100 and in a radial direction indicated by arrow 94. While passing through the pre-separator fleece 64, a portion of the entrained oil in the gaseous stream is coalesced, forming droplets of oil on the pre-separator fleece layer 64. As more oil is coalesced, the droplets enlarge and migrate by gravity towards the end plate 78 where the oil accumulates and puddles into cup portion 112 of the end plate 78. Advantageously, the gaseous stream exiting at pre-separator 64 now has a reduced entrained oil content as it then enters the outer fiber media layer 66. Outer fiber media layer 66 acts to further remove entrained oil by the coalescing process in a manner similar to that performed by the pre-separator fleece 64. The gaseous stream then exits the outer fiber media 66 through the openings 110 in the tubular second support member 90 and is then further processed by the inner fiber media 92 which provides a final coalescing step to remove entrained oil. The gaseous stream, now substantially free of entrained oil, exits the inner fiber media 92 through the openings 108 in the first support member 88 and then proceeds to exit the improved air/oil separator assembly 60 through an outlet passage 102 in the central portion of the flange 76.

Advantageously, the pre-separator fleece 64 is strongly, sealably and permanently secured along opposing edges to the flange 76 and end plate 78, thereby eliminating the risk of the pre-separator fleece 64 becoming detached from the air/oil separator assembly 60 and falling into the separator tank or chamber 10 (as discussed with FIG. 1) where it can obstruct the oil return line at the bottom of the tank or chamber.

Advantageously, the improved air/oil separator 60 allows reduced complexity in the manufacturing process and thereby improves efficiency of the manufacturing operation by eliminating the metal band 50 (see FIG. 2) and the additional gluing operation for the fleece 38 (see FIG. 2), which are additional manual labor steps in the manufacturing that are eliminated by the present invention.

Test Results

Several tests were performed to test and evaluate improved performance of the air/oil separator 60 over the prior art. Oil carryover and differential pressure measurement tests have been carried out on air/oil separator assemblies as depicted on FIGS. 1, 2 and 3. Tests were performed with a GA 22-2 compressor having a capacity of 3.6 cubic meters/minute at a pressure of 8.0 bar g. The typical scavenge oil flow with an air/oil separator having a height of 170 mm is about 13 grams/cubic meter.

The first set of tests was performed using an air/oil separator similar to FIG. 2, having two glass media layers but without the fleece pre-separator layer and without a full outer jacket 40. In this test the scavenge oil flow (flow from the air/oil assembly through the oil scavenge tube) was measured at 13.4 grams/cubic meter at a differential pressure drop across the two glass fiber media layers (no fleece pre-separator layer) of 278 mbar. Oil carryover was measured at 1.2 mg/cubic meter.

In a second test, a first sample of the improved air/oil separator 60 including the pre-separator fleece mounted integrally over the outer glass media layer and internally in the separator assembly (as in FIG. 3) was evaluated. In this test the scavenge oil flow was measured at 13.3 g/cubic meter and a differential pressure of 192 mbar. Oil carryover was measured at 1.0 mg/cubic meter.

In a third test, a second sample of the improved air/oil separator 60 as in FIG. 3 including the pre-separator fleece mounted integrally over the outer glass media layer and internally in the separator assembly (as in FIG. 3) was evaluated. In this test the scavenge oil flow was measured at 12.9 g/cubic meter and a differential pressure of 205 mbar. Oil carryover was measured at 1.2 mg/cubic meter.

Advantageously, test results indicated that the pre-separator fleece 64 wrapped over the outside glass media layer 66 (as shown in FIG. 3) resulted in a typical differential pressure drop reduction of between 73 to 86 mbar across the air/oil separator assembly. These test results indicate that significant amounts of entrained oil had indeed been captured and removed from the air stream before the air stream reached and saturated the outer glass fiber media 66. Advantageously, oil removed by the fleece pre-separator in FIG. 3 passes through the lower portion of the glass fiber media near the end plate 78 and is eventually scavenged at the scavenge tube in the center of the air/oil separator 60. This phenomenon helps to reduce saturation in the glass fiber media 66 and 92 and therefore a lower differential pressure drop across the air/oil separator assembly is observed. The reduced pressure drop is surprising as it occurs even though an additional coalescing media layer (pre-separator 64) has been added.

In summary, the improved air/oil separator assembly according to the present invention has been shown to result in reduced operating pressure drop (due to the reduced oil saturation of the glass fiber media), together with improved oil separation capabilities, while advantageously providing an air/oil separator in which the pre-separator fleece remains secured and retained interior to the outer jacket 100 of the air/oil separator assembly. In the improved air/oil separator assembly of the present invention, prior art issues with the fleece dislodging and falling into the pre-separator tank potentially obstructing removal of accumulating oil are avoided.

While the best modes for carrying out the invention have been described in detail, those familiar with the art to which this invention relates will recognize various alternative designs and embodiments for practicing the invention within the scope of the appended claims.

The invention claimed is:

1. An air/oil separator assembly adapted for removal of entrained oil in a gaseous stream, the assembly comprising:
   a head flange defining an air outlet passage in a portion thereof;
   an end plate positioned in a spaced parallel relationship to said head flange;
   a first elongated support member having a first closed outer wall defining a bore in communication with a plurality of openings through said first outer wall, said first support member secured at one end to said head flange and secured at an opposing end to said end plate;
   a second elongated support member having a second closed outer wall defining a bore in communication with a plurality of openings through said second outer wall, said second support member secured at one end to said head flange and secured at an opposing end to said end plate, wherein said first and second support members define a first annular gap;
   an outer jacket having a plurality of openings therethrough, said outer jacket axially aligned with and spaced outward from said second support member, said outer jacket secured at one end to said head flange and secured at an opposing end to said end plate, wherein said second support member and said outer jacket define a second annular gap;
   a first separator element secured in a position proximate to and outboard of said first support member within said first annular gap;
   a second separator element secured in a position proximate to and outboard of said second support member and within said second annular gap; and
   a pre-separator element secured in a position outboard of, resting against and mounted integrally over an outwardly facing surface of said second separator element within said second annular gap;
   wherein said gaseous stream enters said assembly through said openings in said outer jacket;
   wherein said pre-separator and separator elements are sealably secured along opposing edges to said head flange and said end plate, said sealably securing operative to constrain said gaseous flow to pass in sequence through said pre-separator element, said second separator element and then said first separator element to reach said outlet passage;
   wherein said pre-separator and separator elements are operative to coalesce oil from said gaseous stream;
   wherein said elongated support members are operative to prevent collapse of said separator elements and pre-separator elements;
   wherein said pre-separator improves oil removal performance and reduces pressure drop of said assembly by removing a significant amount of oil before reaching said first and second separator elements; and
   wherein said pre-separator element integrally mounted on said second separator element is operative to reduce oil saturation of said second separator element, lowering differential pressure drop across said air/oil separator assembly.

2. The air/oil separator assembly of claim 1, wherein any of said pre-separator element and said separator elements comprises bi-component fibers.

3. The air/oil separator assembly of claim 1, wherein said first separator element and said second separator element comprise glass fiber media.

4. The air/oil separator assembly of claim 1, wherein said first separator element comprises fleece and wherein said second separator element comprises glass fiber media.

5. The air/oil separator assembly of claim 3 or 4, wherein said pre-separator element comprises fleece.

6. The air/oil separator assembly of claim 5, wherein said support members are tubular in shape.

7. The air/oil separator assembly of claim 5, wherein said support members have an oval cross section.

8. The air/oil separator assembly of claim 5, wherein said means of sealably securing comprises polyurethane.

9. The air oil separator assembly of claim 5, wherein said means of sealably securing is a self-curing or a hot melt adhesive.

* * * * *